United States Patent Office 2,907,799
Patented Oct. 6, 1959

2,907,799

ULLMANN REACTION

Lawrence J. Hughes, University City, Mo., and Leo J. Weaver, Wakefield, Mass., assignors to Monsanto Chemical Company, St. Louis, Mo., a corporation of Delaware No Drawing. Application May 31, 1955
Serial No. 512,322

14 Claims. (Cl. 260—668)

This invention relates to a new and improved method of conducting the Ullmann reaction and to catalysts for effecting a more efficient operation.

The Ullmann reaction is a well known procedure for synthesizing polynuclear aromatic compounds which involves the coupling of aromatic groups. In general, the reaction involves reacting two aromatic halides by heating in the presence of elemental copper. The aromatic halides may be the same or different, although the usual operation takes place between two molecules of the same compound. The following reactions are typical of the Ullmann procedure:

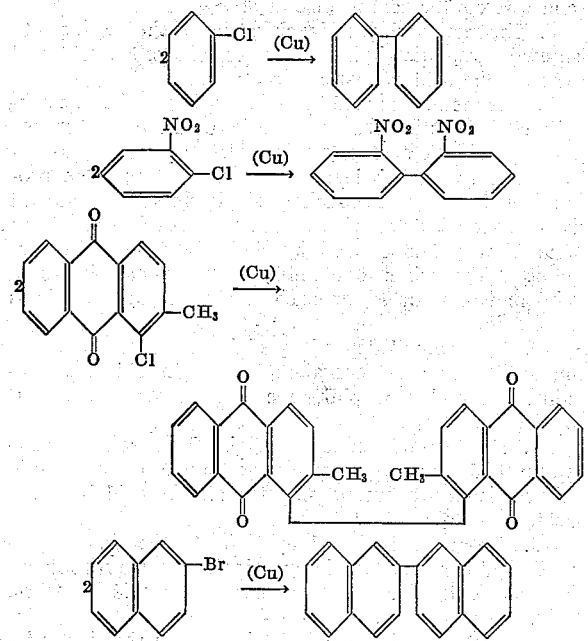

Although it will be apparent that the compositions involving the inter-reaction of two different aromatic halides are possible, because of the problem of separating the several products, these reactions are of lesser importance. The halides which may be used in the practice of this invention are preferably chlorides, bromides or iodides, the fluorides being of lesser importance because of the rigorous conditions required to effect a practicable reaction. The Ullmann process involves the mixing of the aromatic halide, or plurality of halides, with elemental copper in finely divided state. Pure copper or a copper alloy, such as brass or bronze, may be used. In view of the fact that the copper enters the reaction to form at least what is believed to be a transitional metal organo compound, a stoichiometric proportion must be used. In the usual procedures several hundred per cent of the stoichiometric requirements are charged to the reactor, because of the difficulty in subdividing the metal particles to a sufficient extent to utilize all of the copper. Although the copper serves to remove the halogen from the reactant, the metal particles are reacted only on the surface and the non-reactive surface of copper oxide or halide prevents further reaction. In the normal operation of the Ullmann process there is usually an inception period before the reaction is initiated, the reagents requiring a substantial period of time under the reaction conditions before the first chemical reaction occurs.

In accordance with this novel procedure the Ullmann reactions are conducted in the presence of a mixture of the elemental copper or copper alloy and an aliphatic carboxylic acid having from 10 to 24 carbon atoms. The precise mechanism of the reaction has not been definitely ascertained, however, in the presence of the carboxylic acids there is no protective surface coating formed on the metal particles and as a result virtually all of the copper is consumed. The very large excess which encumbers the reaction and complicates the product separation, is not required. In the practice of the new procedure in the presence of carboxylic acids having from 10 to 24 carbon atoms, the reaction becomes almost immediate and the usual inception period is not required.

Suitable carboxylic acids for the practice of this invention are:

Stearic acid          Myristic acid
Arachidic acid        Linoleic acid
Palmitic acid         Linolinic acid
Behenic acid          Carnaubic acid
Margaric acid         Lauric acid and analogous acids, both saturated and unsaturated, which have from 10 to 24 carbon atoms and mixtures of any of the above acids as derived by the saponification of animal or vegetable oils.

In the practice of the method of this invention a stoichiometric proportion or at the most a slight excess of stoichiometric requirements of copper is used and from 0.1% to 10% of the stoichiometric equivalent of stearic acid is used which is intimately mixed with the copper, preferably by milling or grinding with the finely divided metal powder. The quantity of the aliphatic acids required in the practice of this invention will be sufficient to substantially utilize the copper metal but not in quantity to prevent a free flowing suspension of the metal powder in the reaction medium.

A novel Ullmann process reactant is a copper or copper alloy in finely divided state which is intimately mixed with a fatty acid having from 10 to 24 carbon atoms. Preferred reactants of this type will have from 0.1 to 10% of the stoichiometric equivalent of the copper in the metal powder. These reactants are preferably prepared by grinding the copper or copper alloy in the presence of the required amount of the solid carboxylic acid.

In the usual practice of the Ullmann reaction, temperatures between 100 and 400° C. are used, being sufficiently high to promote an active reaction and to insure the existence of a fluid liquid reaction mixture, but not high enough to induce the decomposition of the reactants or product. In the preparation of high molecular weight aromatic compounds by the Ullmann process, it is frequently necessary to introduce an inert solvent so as to dissolve the high molecular weight reactants and thereby produce a liquid reaction mixture.

Suitable organic solvents for this purpose are benzene, alkyl benzenes, aliphatic hydrocarbons and mixtures thereof, i.e. gasoline, kerosene, benzol and by-products of the alkylation reaction containing aromatic hydrocarbons and the aliphatic alkylation agents. When the reaction mixture is diluted to a thin slurry, it is readily filtered to remove the spent catalyst and cooled to crystallize the products. If desired, they may be purified by one or more recrystallizations.

Further details of the practice of the novel method utilizing the novel elemental copper reactants are set forth with respect to the following specific examples.

Example 1

A 500 ml. reaction flask is charged with 200 g. of o-chloronitrobenzene. A 133 g. quantity of electrolytic copper acid is milled with 7 g. of stearic acid and the resulting mass added gradually to the reaction flask over a twenty-five minute period while maintaining the contents of the flask at 210° C. An exothermic reaction which begins as soon as the first increment of copper contacts the o-chloronitrobenzene continues at a regular rate throughout the entire addition and for ten minutes after the addition has been completed. The reaction mixture is then heated at 210° C. for an additional fifty minutes to complete the reaction. The mixture, after cooling to about 130° C., is diluted with a mixture of kerosene and alkylbenzenes having a boiling range between 135° C. and 190° C. The catalyst residue is removed by filtering and the filtrate cooled to precipitate a substantial yield of o,o'-dinitrobiphenyl.

The identical procedure was repeated except that the electrolytic copper was not milled with stearic acid prior to use. From the addition of the copper no reaction took place even though the temperature was increased to 240° C. After standing for thirty minutes, at which time 60 g. of the copper had been added, the reaction began and soon became strongly exothermic and difficult to control. After the initial reaction had subsided the balance of the copper was added at a rate necessary to keep the reaction under control. The product was then separated in the same manner and a lower yield of product was recovered.

Example 2

Using the procedure described in the previous example, 138 g. of o-chloronitrobenzene is reacted with a smaller quantity (91.9 g.) of electrolytic copper previously milled with 5% by weight of stearic acid. The copper-stearic acid mixture is added gradually over a period of forty minutes at a rate which permits the exothermic reaction to remain under control. After all of the catalyst has been added, the reaction mixture is maintained at 240° C. for an additional twenty minutes. The resulting product is recovered from the reaction mixture by diluting with an equal volume of a mixture of aliphatic and aromatic hydrocarbons and after filtering the product, the filtrate is crystallized by cooling the solution.

Example 3

The procedure of the preceding example is repeated except that bromobenzene is used as the principal reactant. A quicker and more efficient reaction is obtained through the use of copper powder mixed with a mixture of fatty acid derived by the saponification of coconut oil. The resulting product has the following structure:

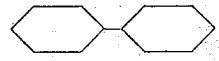

Example 4

The procedures described in 1 to 3 above is repeated except that α-chloronaphthalene was used as the principal reagents. A reaction utilizing bronze powder mixed with 5% stearic acid produces a compound identified as:

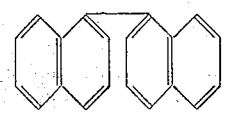

What is claimed is:

1. The method of preparing bisymmetrical aromatic compounds which comprises heating ring substituted aromatic hydrocarbons wherein the said ring substituted groups are selected from the class consisting of alkyl radicals having up to 3 carbon atoms, nitro radicals, oxo groups, chlorine, bromine and iodine, at least one of said substituents being a halogen, in the presence of finely divided metallic copper and an acid having the structure

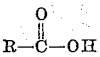

wherein R is an aliphatic hydrocarbon radical, said acid having from 10 to 24 carbon atoms.

2. The method of preparing compounds containing two identical aromatic nuclei in adjacent positions which comprises heating at a temperature between 100 and 400° C. an aromatic hydrocarbon having a single chlorine substituent in the presence of finely divided metallic copper and from 0.1 to 10.0% (based on the metallic copper) of an acid having the structure

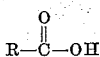

wherein R is an aliphatic hydrocarbon radical, said acid having from 10 to 24 carbon atoms.

3. The method defined by claim 1 wherein the ring substituted aromatic hydrocarbon is chlorobenzene and wherein the acid is oleic acid.

4. The method defined by claim 1 wherein the ring substituted aromatic hydrocarbon is o-chloronitrobenzene and wherein the acid is oleic acid.

5. The method defined by claim 1 wherein the ring substituted aromatic hydrocarbon is o-chloronaphthalene and wherein the acid is oleic acid.

6. The method defined by claim 1 wherein the ring substituted aromatic hydrocarbon is chlorobenzene and wherein the acid is stearic acid.

7. The method defined by claim 1 wherein the ring substituted aromatic hydrocarbon is o-chloronitrobenzene and wherein the acid is stearic acid.

8. The method defined by claim 2 wherein the aromatic hydrocarbon containing a single chlorine substituent is chlorobenzene and wherein the acid is oleic acid.

9. The method defined by claim 2 wherein the aromatic hydrocarbon containing a single chlorine substituent is o-chloronitrobenzene and wherein the acid is oleic acid.

10. The method defined by claim 2 wherein the aromatic hydrocarbon containing a single chlorine substituent is o-chloronaphthalene and wherein the acid is oleic acid.

11. The method defined by claim 2 wherein the aromatic hydrocarbon containing a single chlorine substituent is chlorobenzene and wherein the acid is stearic acid.

12. The method defined by claim 2 wherein the aromatic hydrocarbon containing a single chlorine substituent is o-chloronitrobenzene and wherein the acid is stearic acid.

13. The method of claim 1 wherein the acid is a mixture of acids derived by the saponification of a vegetable oil.

14. The method of claim 2 wherein the acid is a mixture of acids derived by the saponification of a vegetable oil.

References Cited in the file of this patent

UNITED STATES PATENTS

| | | |
|---|---|---|
| 1,926,055 | Nieuwland et al. | Sept. 12, 1933 |
| 2,339,929 | Houghton | Jan. 25, 1944 |
| 2,394,608 | Hansley | Feb. 12, 1946 |
| 2,584,041 | Nowak et al. | Jan. 29, 1952 |

OTHER REFERENCES

Cohen: "Organic Chemistry" (London: Longmans, Green & Co., 1923), 4th edition, part I, pages 231–232.

Hansley: Ind. and Eng. Chem., vol. 43, No. 8, August 1951, pp. 1759–1766 (pp. 1759 and 1760 only relied on).

Schmidt et al.: "Organic Chemistry," Gurney and Jackson (London), 1950 (page 543 relied on).